June 2, 1942.                    J. CZAJKA                    2,285,148
WORK HOLDER
Filed March 13, 1940
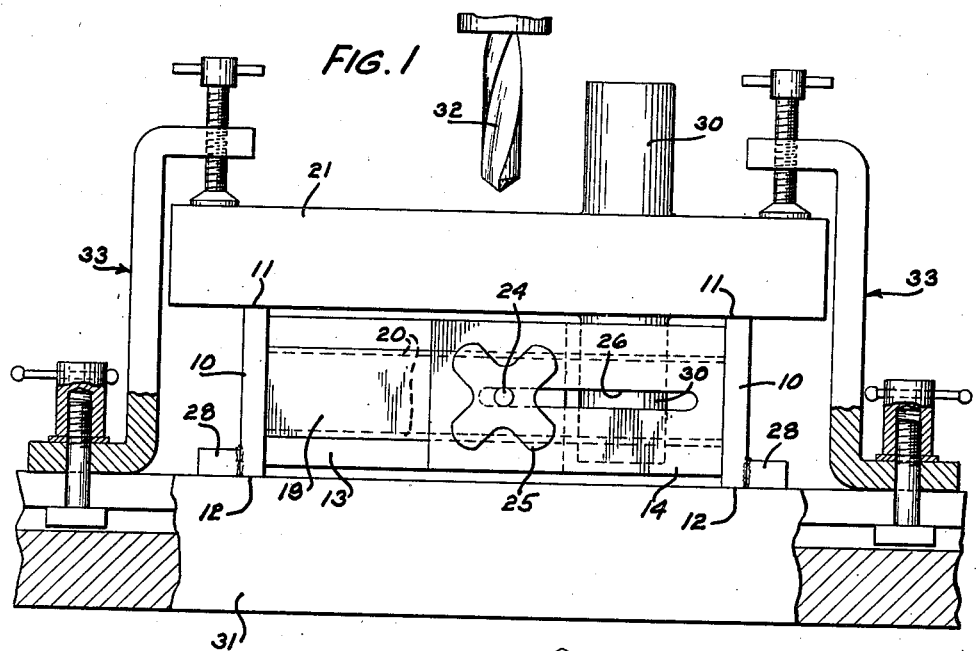
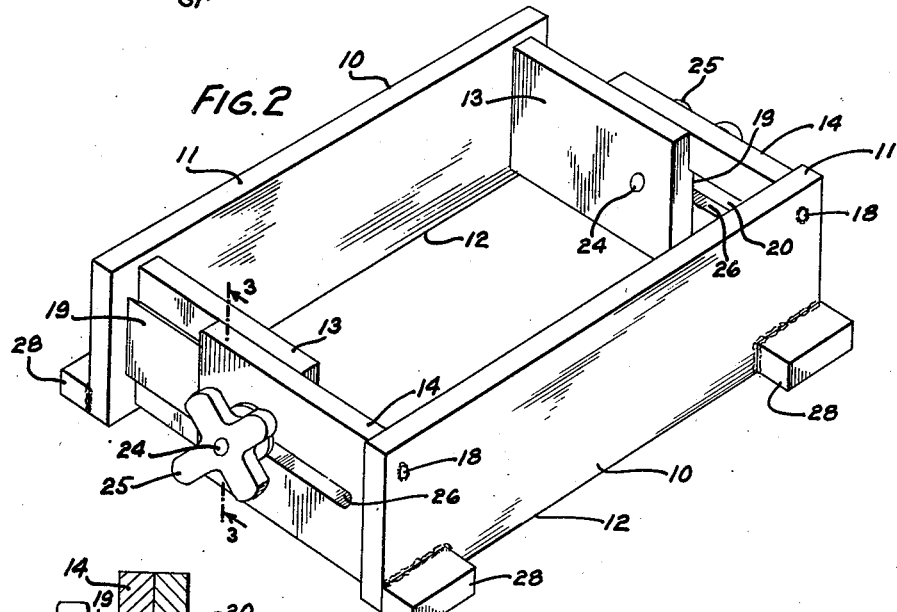
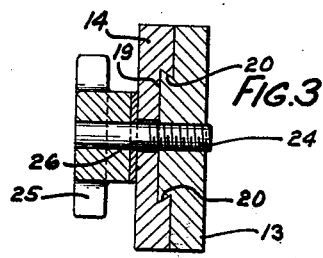
INVENTOR
J. CZAJKA
BY Emery Robinson.
ATTORNEY Patented June 2, 1942

2,285,148

UNITED STATES PATENT OFFICE 2,285,148

WORK HOLDER

John Czajka, Chicago, Ill., assignor to Western Electric Company, Incorporated, New York, N. Y., a corporation of New York Application March 13, 1940, Serial No. 323,678

7 Claims. (Cl. 90—59)

This invention relates to work supports and more particularly to an adjustable support for mounting work upon the bed of a machine tool during machining operations.

It has been the practice in some instances, while machining work in drill presses or other machine tools, particularly where the work has protruding portions or members, to support the work upon upper faces of spaced individual bars or parallels with the protruding portions depending between the parallels. In this position the upper faces of the parallels are parallel relative to the bed of the machine. At times, either while performing operations on the work or while positioning and clamping the work in position, the individual parallels tip or slide away from each other, since they are not joined. Thus, a hazardous condition is present since injury might be inflicted on an operator, or the working tools.

An object of the present invention is to provide a work support for the hereinbefore described purpose which is simple, efficient and readily adjustable for different widths of work and which may be used with a minimum of tipping or sliding, thereby resulting in a maximum of safety to an operator and the prevention of damage to tools.

In attaining this and other objects, the improved work support in accordance with one embodiment thereof is in the form of an adjustable box frame or box type parallels in which the side members are adjustable to and from each other. These side members are interconnected at their ends by sets of angularly extending end members having cooperating dovetail guides and grooves whereby each set of end members may be slidably adjusted upon the other to vary the space between the side members for different widths of work. Clamping means are provided for each set of end members to retain the parallels in their adjusted position.

The invention will be fully understood from the following description taken in connection with the accompanying drawing, in which Fig. 1 is an end view of the work support embodying the features of the invention shown carried on the bed of a drill press, which is shown fragmentarily and partly in section, work being shown mounted on the support and clamped to the bed of the press in a usual manner;

Fig. 2 is a perspective view of the work support shown in Fig. 1, and

Fig. 3 is a detail cross-section taken on the line 3—3 of Fig. 2.

Referring now to the drawing, particularly to Figs. 2 and 3, the work support in the present embodiment thereof comprises a pair of similar flat bars or parallels 10 preferably of steel having their upper and lower longitudinal edge faces 11 and 12 accurately ground or finished to provide parallel pairs of aligned faces. Secured to each of the bars 10 in offset relation upon their inner opposed vertical surfaces adjacent their ends are sets of comparatively short bars 13 and 14. Each of the bars 13 and 14 is disposed at right angles to the bars 10 and are similarly secured thereto by a pair of screws extending through the bars 10 and threaded into the bars 13 and 14, the heads of the screws being flush with the outer surfaces of the bars 10 and are welded thereto, as indicated at 18.

Formed in each set of bars 13 and 14 are cooperating longitudinally extending dovetail guides and grooves 19 and 20, respectively, whereby the bars may be slidably adjusted upon each other, the opposed vertical surfaces of the bars abutting. The frame or box-like structure formed of the bars or parallels 10 and the sets of bars 13 and 14 which are slidable upon each other may thus be adjusted in one direction within limits, dependent upon the length of the overlapping bars 13 and 14, to vary the distance between the parallels 10 and thereby suit different widths of work, indicated at 21 (Fig. 1), which is to be mounted upon the upper parallel faces 11 of the parallels 10.

In order to retain the parallels 10 in their adjusted position a clamping screw 24 having fixed thereto a hand grip member 25 is associated with each set of bars 13 and 14, each screw extending freely through a slot 26 formed in and extending longitudinally of the bar 14 and into a threaded aperture in the bar 13. By rotating the hand grip member 24 in one direction to thread the screw 24 into the bar 13, the bars 13 and 14 are clamped together, a reverse direction of rotation of the member 25 releasing the bars and permitting them to be adjusted longitudinally of each other, the screw 24 sliding along the slot 26.

Welded to the outer longitudinal vertical surfaces of the parallels 10 at the ends thereof are blocks 28 forming feet to provide greater bearing surfaces for the box-type parallels and thus greater resistance against tipping when in use, the lower faces of the blocks 28 being aligned with the lower faces 12 of the parallels 10.

In using the box-type parallels hereinbefore described they are first adjusted in the manner previously described to suit the width of the particular piece of work 21 to be mounted thereon. As illustrated in the particular setup illustrated in Fig. 1 the piece of work 21 has protruding portions 30 upon opposite surfaces, the surfaces being parallel to the upper surface of a drill press bed 31, the press having a drill 32 for operating on the work. The box-type parallels are first placed upon the bed 31 and the work 21 is then mounted upon the upper faces 11 of the parallels 10 with the depending portion 30 of the work arranged in the clear open space provided between the inner faces of the box-type parallels. After the box-type parallels carrying the work 21 is correctly positioned relative to the drill 32 the work and the parallels are clamped securely to the drill press bed 31 by suitable clamps 33 in a manner well understood in the art.

It will be obvious that by employing the simple, efficient and readily adjustable parallels of the above described type for mounting work upon the bed of a machine tool that work of different widths may be firmly supported during the clamping thereof to the machine bed as well as during machining operations and without any tendency of the parallels to tip or slide, thus providing a maximum of safety to an operator and preventing damage to the working tools. Furthermore, that due to the particular construction and arrangement of the box-type parallels which provides a maximum of unobstructed space between the parallels 10 and the end bars 13 and 14 a wide variety of work having protruding portions in various positions may be efficiently supported for machining operations.

It will be understood that the specific embodiment of the invention as herein described and illustrated is to be interpreted as merely illustrative and that it is capable of other applications and that modifications can be made without departing from the spirit and scope of the appended claims.

What is claimed is:

1. A work support for mounting work on a bed of a machine tool comprising an adjustable frame-like structure having an unobstructed open space therein, said structure including spaced members with upper faces upon which work spanning the members is supported, bottom bearing faces of the members being parallel to the machine tool bed, and elements adjustably connected to each other and connected to the members to permit adjustment of the members toward or from each other to accommodate different sizes of work.

2. A work support for mounting work on a bed of a machine tool comprising an adjustable frame-like structure having an unobstructed open space therein, said structure including spaced members with upper aligned faces upon which work spanning the members is supported, bottom bearing faces of the members being parallel to said upper faces and to the machine tool bed, and elements adjustably connected to each other and joined to the members to permit adjustment of the members toward or from each other to accommodate different sizes of work.

3. A work support for mounting work on a bed of a machine tool comprising an adjustable frame-like structure having an unobstructed open space therein, said structure including spaced parallel members with upper aligned faces upon which work spanning the members is supported, bottom bearing faces of the members being parallel to said upper faces and to the machine tool bed, and elements slidably adjustable upon each other and extending between and connected to the ends of the members to permit adjustment of the members toward or from each other to accommodate different sizes of work.

4. A work support for mounting work on a bed of a machine tool comprising an adjustable frame-like structure having an unobstructed open space therein, said structure including spaced parallel members with upper and bottom parallel faces for supporting work spanning the members and mounted upon said upper faces parallel to the machine tool bed, and elements adjustably connected to each other and connected to the members to permit adjustment of the members toward and from each other to accommodate different sizes of work.

5. A work support for mounting work on a bed of a machine tool comprising an adjustable frame-like structure having an unobstructed open space therein, said structure including spaced members with upper faces upon which work spanning the members is supported, bottom bearing faces of the members being parallel to the machine tool bed, said members having outwardly extending feet adjacent their bottom bearing faces to increase their bearing faces, and elements connected at one end to and extending from each of the members and arranged in overlapping relation at their opposite ends, means for adjustably connecting the overlapping ends of said members to vary the extent of overlap to permit adjustment of the members toward and from each other to accommodate different sizes of work.

6. A work support for mounting work on a bed of a machine tool comprising an adjustable box or frame-like structure having an unobstructed open space therein, said structure including spaced parallel side members upon the upper faces of which work spanning the members is supported, bottom bearing faces of the members being parallel to the machine tool bed, end members connected at one end to and extending from each of the side members at the ends thereof and arranged in overlapping relation at their opposite ends, and means for adjustably connecting the overlapping ends of said end members to vary the extent of overlap to permit adjustment of the members toward or from each other to accommodate different sizes of work.

7. A work support for mounting work on a bed of a machine tool comprising a box or frame-like structure having an unobstructed open space therein, said structure including spaced parallel side members upon the upper faces of which work spanning the members is supported, bottom bearing faces of the members being parallel to the machine tool bed, said side members having outwardly extending feet adjacent their bottom bearing faces to increase their bearing faces, end members fixed at one end to and extending from each of the side members at the ends thereof and arranged in overlapping relation to slide upon each other at their opposite ends to permit adjustment of the side members toward and from each other to accommodate different sizes of work, said overlapping end members having cooperating tongues and grooves for guiding the elements during adjustment, and means for clamping said overlapping end members in their adjusted positions.

JOHN CZAJKA.